May 9, 1944.    J. T. McCROSSON    2,348,486
STERILIZING APPARATUS
Filed Nov. 8, 1940    2 Sheets-Sheet 1

INVENTOR.
John T. McCrosson,
BY George D. Richards
ATTORNEY.

May 9, 1944. J. T. McCROSSON 2,348,486
STERILIZING APPARATUS
Filed Nov. 8, 1940 2 Sheets—Sheet 2

INVENTOR.
John T. McCrosson,
BY George D. Richards
ATTORNEY.

Patented May 9, 1944

2,348,486

UNITED STATES PATENT OFFICE 2,348,486

STERILIZING APPARATUS

John T. McCrosson, New York, N. Y.

Application November 8, 1940, Serial No. 364,805

2 Claims. (Cl. 21—74)

This invention relates to improvements in means operative at relatively low temperature for treating pineapple and similar fruit preparatory to packing thereof in containers for commercial distribution; and the invention has reference, more particularly, to means for sterilizing and dehydrating pineapple flesh and juice without destroying the vitamins, esters, enzymes or natural digestive ferments contained therein, together with means whereby the treatment is carried on within a sterile atmosphere, so that the resultant product is subject to no risk of contamination prior to and during deposit and sealing thereof in the commercial containers.

This invention has for an object to provide, within a treating and packing room wherein an atmosphere of sterilized air, at a pressure somewhat in excess of the outside atmosphere, is maintained by air admission and sterilizing means, novel apparatus for treating pineapple flesh and juice preparatory to canning thereof including means to dehydrate the pineapple flesh and to sterilize the same by subjection to light rays having germicidal, bactericidal and fungicidal effects, and to separately sterilize by like method and then concentrate pineapple juice preparatory to deposit and sealing of the flesh and concentrated juice in cans or other commercial containers, whereby the flesh and juice is not only sterilized at temperatures sufficiently low to insure non-impairment of the contained vitamins, esters, enzymes and natural digestive ferments, but the flesh is also rendered highly absorbent of the concentrated juice when syruped therewith in the container.

The invention also comprehends novel apparatus for sterilizing and concentrating pineapple and other fruit juices in cases where such juices are desired to be alone packed and sealed in commercial containers.

Other objects of this invention, not at this time more particularly enumerated, will be understood from the following detailed description of the same.

An illustrative embodiment of apparatus for the above stated purposes is shown in the accompanying drawings, in which—

Figure 1:
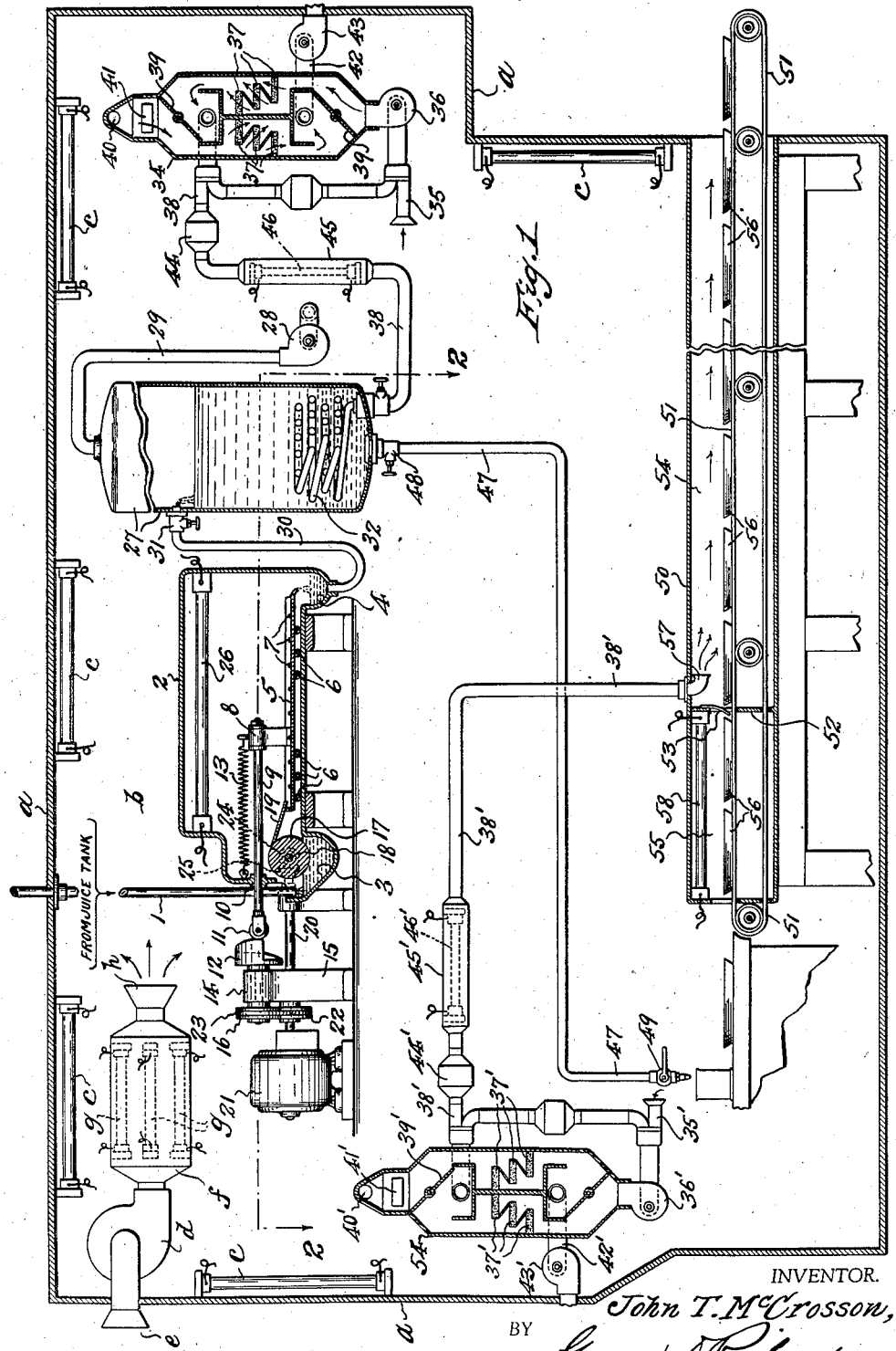
Figure 2:
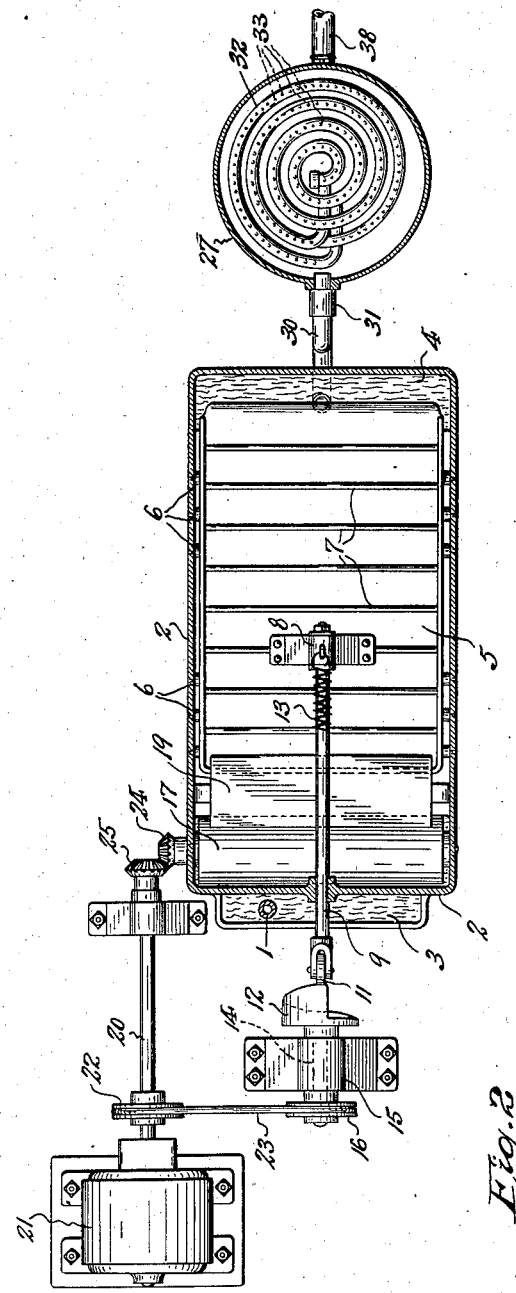

Fig. 1 is a vertical longitudinal sectional view, more or less schematically shown, of the treating and packing room and apparatus therein for treating pineapple flesh and juice preparatory to packing and according to the principles of this invention; and Fig. 2 is a detail horizontal sectional view, taken on line 2—2 in Fig. 1, but drawn on a somewhat enlarged scale.

Similar characters of reference are employed in the above described views, to indicate corresponding parts.

In Fig. 1, the reference character $a$ indicates the enclosing walls of a treating and packing room, within the interior $b$ of which are suitably located and supported a number of sterile ray emitting lamps $c$, the emitted ultraviolet rays of which are dispersed through the room atmosphere so as to destroy any contained germs, bacteria, mold spores, etc. A suitable air intake pump or fan $d$ is so mounted that its intake $e$ communicates with the atmosphere outside the room interior $b$, to draw air therefrom. Connected in communication with the discharge of said pump or fan $d$ is an ingoing air sterilizing chamber $f$ which is equipped with sterile ray lamps $g$, the sterilizing light rays of which are discharged into the air prior to delivery of the air through the discharge outlet $h$ into the room interior $b$. Said pump or fan is so operated as to not only replace air discharged from the room interior during operation of the flesh and juice treating agencies, but also to supply air at such rate and volume as to maintain the pressure thereof within the room interior somewhat in excess of the outside atmosphere, whereby no breathing or leaking into the room interior $b$ of outside non-sterile air occurs.

The pineapple juice to be treated is delivered through a delivery conduit $i$ adapted to enter the room interior $b$ from a juice supply or storage tank (not shown) to means for first subjecting the same to a sterilization treatment. To effect the sterilization of the juice, the same is caused to pass through a vibratory sterilizer apparatus of novel character, and in such manner that all parts of the juice mass are thoroughly drenched with sterile light rays. This vibratory sterilizer comprises a housing 2 having a juice intake basin 3 at one end and a discharge basin 4 at its other end. The juice delivery conduit $i$ discharges into said juice intake basin 3. Mounted within said housing 2, between the intake and discharge basins, is a vibratory tray 5, mounted to ride on rollers 6 for longitudinal reciprocation, preferably in a slightly inclined plane descending from its receiving end to its discharge end; said rollers being journaled in and between the side walls of the housing 2. It is desirable that the tray bottom be provided with longitudinally spaced, transverse riffles 7. Affixed to said tray is an upstanding standard or bracket 8 to which is secured one end of a push-bar or rod 9, the free end portion of which extends slidably through a bearing 10 connected with an end wall of the housing 2. The free end of said push-bar or rod 9 is provided with an anti-friction roller 11 which bears operatively against a driven rotary vibrator cam member 12. Pull spring means 13 is connected between the standard or bracket 8 and the aforesaid end wall of the housing 2, whereby the vibratory tray 5 is retracted and the roller 11 of its push-bar or rod 9 caused to engage and follow the operative face of the cam member 12. The shaft 14 of said cam member 12 is journaled in a pedestal bearing 15, and affixed to said shaft is a pulley 16 or other suitable power transmission element for driving the same.

Mounted within the juice intake basin, in contact with the juice contained therein, is a rotary pick-up drum 17, the shaft 18 of which is journaled in and between the side walls of the housing 2. Cooperative with the surface of said drum 17 is one transverse margin of a doctor blade 19. This doctor blade inclines downwardly from the drum 17 so that its free transverse margin overhangs the receiving end of the vibratory tray 5, whereby to discharge juice collected from the drum 17 into the latter.

Suitable means is provided for driving said cam member 12 and said drum 17. Illustratively, such driving means comprises a drive shaft 20, which is driven by an electric motor 21, or from any other suitable power source. On said drive shaft 19 is a drive pulley 22 which operates a drive belt 23 running over the pulley 16 which drives the cam member 12. Affixed to an exterior end of the drum shaft 18 is a bevel gear 24 with which meshes a cooperating driving bevel gear 25 which is fixed on and driven by said drive shaft 20.

Suitably mounted within the upper part of the housing 2 above the vibratory tray 5 are ultra violet ray emitting lamps 26 which are disposed to discharge their emitted sterilizing light rays upon the juice moved in and over the vibratory tray 5.

In the operation of the juice sterilizer, as the surface of the rotated pick-up drum 17 submerges in the juice contained in the intake basin 3, a film thereof is picked up and carried to the doctor blade 19 which removes the juice and deflects the same into the vibratory tray 5. In this manner, a slowly progressing film of juice is caused to flow and spread upon the surface of said tray 5. The rotating vibrator cam member 12, acting upon the push-bar or rod 9, slowly thrusts forward the tray against the pull of the spring 13 until roller 11 of the push-bar or rod abruptly drops off the high point of the cam member back to the low point of the latter, so that the stored tension of the pull spring 13 suddenly snaps the tray 5 back to initial position, such reciprocable vibration of the tray continuously recurring under the influence of the rotated cam member. The inertia of the juice, when the tray 5 is thus suddenly snapped back, causes the thin film or mass of the juice spread upon the tray surface to be thoroughly agitated, tumbled upon itself or disrupted, the riffles 7 aiding this effect, and consequently all particles of the juice film or mass are so tumbled about and disrupted as to be thoroughly exposed to and drenched by the sterile light rays emanating from the lamps 26. Since the juice film is very thin, approximating about $\frac{1}{32}$ of an inch in thickness, its thorough and adequate exposure to the sterile light rays is assured, as it slowly progresses along the tray surface and before it finally discharges from the latter into the discharge basin 4 wherein it is collected. By reason of the thorough and efficient exposure of all particles of juice to the sterile light rays, any harmful bacteria, germs, mold spore, etc., are killed off so as to efficiently sterilize the juice, and since such sterilization can be carried on at relatively low temperature, no risk of boiling off or destruction of desirable vitamins, esters, enzymes or natural digestive ferments which are contained in the fresh juice arises, and these desirable principles are retained substantially unimpaired.

For syruping canned pineapple flesh, and when it is desired to pack a concentrated juice only, the sterilized juice is subjected to a concentrating operation under conditions calculated to maintain its sterile condition. To this end the juice sterilizer is cooperatively connected to a novel concentrating means into which the sterile juice is immediately discharged from said sterilizer. This concentrator comprises an enclosed chamber or vacuum pan 27 from which air is constantly exhausted by a suitably driven exhaust pump 28 connected to the top thereof by conduit means 29, thus maintaining a substantially reduced atmospheric pressure within the vacuum pan interior. The outlet of said pump 28 communicates with the outside atmosphere, so as to discharge vapors from said vacuum pan outside the room interior b. The discharge basin 4 of the juice sterilizer is connected by a conduit 30 through which the juice flows from the juice sterilizer into the vacuum pan interior. Valve means 31 in the line of said conduit 30 may be provided for opening and closing said conduit to juice flow as may from time to time be desired.

In the bottom end of said vacuum pan is arranged an air emission means, which may be of any suitable form adapted to dispersingly discharge air for ebullition through the volume of juice contained in the vacuum pan. Preferably said air emission means comprises a suitably formed pipe coil 32 having discharge perforations 33 along the length thereof, and preferably located on the under sides of coil convolutions. The air emission coil 32 is submerged in the juice content of the vacuum pan so that the air emitted therefrom will be dispersed throughout the cross-sectional area of the juice mass, and so as to bubble upwardly therethrough in intimate contact with all portions of the volume thereof. Connected with said air emission coil is means for delivering thereto dry sterile air, whereby, due to its sterile condition, no risk of contamination of the juice through which it passes is involved, and, by reason of its dry or dehydrated condition, said air is readily adapted to take up or absorb and carry off from the juice a considerable part of the water content of the latter, thereby to concentrate the same to the degree desired. The vapor formed by the air saturated by the water taken up thereby from the juice is discharged from the top of the vacuum pan through the conduit 29 by the action of the exhaust pump 28.

The means for supplying dry sterile air to the air emission coil 32 of the vacuum pan comprises a dehydrator apparatus 34 of the silica gel type, the same having an air intake 35 communicating with a suitable air impeller means 36 whereby air, drawn from the room interior b, is driven through the operative silica gel beds 37 for removal of its moisture content, and as thus dried thereupon discharged through a delivery conduit 38 leading to and connected in communication with the air emission coil 32 of the vacuum pan. The silica gel beds 37 are arranged in segregated groups, air flow to which is controlled by dampers 39, whereby when one group thereof is in use, the other group may be subjected to reactivation by circulation therethrough of warm activating air admitted from the atmosphere outside the room interior b through an intake 40 having suitably associated air heating means 41, and then discharged through a conduit 42 in which is connected suitable air impeller means 43, which discharges to the atmosphere outside the room interior b. Included in the delivery conduit 38 is a cooler chamber 44 which contains a cold water circulating coil (not shown) over which the dry air passes so that the same is cooled to a temperature preferably not in excess of 120 degrees F. Also connected in the line of said delivery conduit 38 is an air sterilizing chamber 45 which is equipped with one or more sterile ray lamps 46, the sterilizing light rays of which are discharged into the air as it flows from the dehydrator apparatus 34 to the air emission coil 32 of the vacuum pan, thereby further assuring that the dry air ebullated through the juice in the vacuum pan is sterile and non-contaminating.

Leading from the bottom of the vacuum pan is a concentrated juice delivery conduit 47 having suitable valve means 48 for opening and closing thereof, whereby the concentrated juice may be discharged from the vacuum pan and led to a point within the room interior b where the canning or packing operations are carried out, to be there delivered into the packing containers under the control of a discharge valve, faucet or like means 49.

From the above it will also be understood that the process of concentrating the juice by the described apparatus attains the concentrating effect without necessity to resort to high temperatures, and consequently no risk of impairment or destruction of desirable vitamins, esters, enzymes and natural digestive ferments arises during the concentrating step of the preparatory treatment.

The pineapple flesh to be treated is first cut into slices, chunks or other dissected body form, and then subjected to action of a dehydrating means calculated to remove therefrom a substantial portion of its water content, and thereafter sterilized preparatory to packing in containers. The apparatus to accomplish this treatment comprises a chamber or tunnel structure 50. Arranged to run through this chamber or tunnel structure is a suitably driven traveling conveyor means 51. Said chamber or tunnel structure is divided intermediate its ends, by partition means 52 including a yieldable curtain means 53, to provide a dehydrating chamber 54 and a sterilizing chamber 55. The pineapple slices or the like are deposited in open trays 56, preferably made of wire mesh. The loaded trays are placed on the conveyor means 51 so as to be carried thereby through the chambers of the tunnel structure. Means is provided for passing a current of dry sterile air through the dehydrating chamber 54, preferably in direction counter to the movement of the fruit loaded trays 56 moved therethrough by the conveyor means 51. The dry sterile air thus provided contacts the fruit in the trays 54 and operates to take up or absorb moisture from the pineapple flesh, so as to leave the latter in a relatively dry and highly moisture absorbent condition.

The means for supplying dry sterile air for movement through the dehydrating chamber 54 comprises a dehydrator apparatus of the same general type and construction above described in connection with the juice concentrating means as is evidenced by the application thereto of corresponding primed reference characters in identification of its parts. The delivery conduit 38' extends to the chamber or tunnel structure 50 to enter through a wall thereof adjacent to the partition means 52 and its curtain means 53, and so as to terminate, within the interior of the inner end portion of the dehydrating chamber 54, in an air discharge outlet 57.

As the loaded trays 56 reach the inner end of the dehydrating chamber 54, the same pass therefrom into and through the sterilizing chamber 55. Suitably mounted within the upper part of said sterilizing chamber 55 are ultra-violet ray emitting or sterile lamps 58 which discharge their emitted sterilizing light rays upon the pineapple flesh contained in the trays, whereby said flesh is drenched by said rays so as to effect destruction of harmful bacteria, germs, mold spore, etc. As in the case of the juice sterilization, such sterilization of the pineapple flesh is carried out at relatively low temperature so that no risk of destruction of desirable vitamins, esters, enzymes or natural digestive ferments is involved.

After emerging from the sterilizing chamber 55 the trays 56 are delivered to a point, within the room interior b, where the canning or packing operations are carried out, to be there deposited in the packing containers and syruped with the sterile concentrated juice, whereupon the filled containers are closed and sealed. These packing operations may be carried out in any suitable manner and by the aid of any suitable mechanism well known to the industry.

Having now described my invention, I claim:

1. A room structure within which to sterilize and pack food and other products comprising enclosing walls to provide a confined interior atmosphere which is segregated from the outside atmosphere, means to deliver outside air into the room interior operative to maintain therein an air pressure somewhat in excess of outside atmospheric pressure, the discharge portion of said air delivery means having means to sterilize the ingoing air by ultra violet ray irradiation, and air drying means operative to draw part of the air and segregate the same from the interior atmosphere of the room subject for use in treating products processed within the room, said air drying means also having means to sterilize dry air discharged therefrom by ultra violet ray irradiation.

2. A room structure within which to sterilize and pack food and other products comprising enclosing walls to provide a confined interior atmosphere which is segregated from the outside atmosphere, means to deliver outside air into the room interior operative to maintain therein an air pressure somewhat in excess of outside atmospheric pressure, the discharge portion of said air delivery means having means to sterilize the ingoing air by ultra violet ray irradiation, ultra violet ray emission means spaced around the room interior to irradiate the room atmosphere, whereby to maintain a sterile condition thereof, air drying means operative to draw part of the air and segregate the same from the interior atmosphere of the room subject for use in treating products processed within the room, said air drying means also having means to sterilize dry air discharged therefrom by ultra violet ray irradiation.

JOHN T. McCROSSON.